United States Patent [19]

Ida et al.

[11] Patent Number: 5,004,785

[45] Date of Patent: * Apr. 2, 1991

[54] LIGHT-DIFFUSING METHACRYLIC RESIN AND PROCESS FOR PRODUCTION THEREOF

[75] Inventors: Kozo Ida, Tokyo; Tetsuya Horiuchi, Otake, both of Japan

[73] Assignee: Mitsubishi Rayon Co., Ltd., Tokyo, Japan

[ * ] Notice: The portion of the term of this patent subsequent to Oct. 6, 2007 has been disclaimed.

[21] Appl. No.: 276,955

[22] Filed: Nov. 28, 1988

[30] Foreign Application Priority Data

Nov. 30, 1987 [JP]  Japan .................. 62-302085

[51] Int. Cl.$^5$ .................. C08F 265/04; C08F 267/06
[52] U.S. Cl. .................. 525/305; 525/309; 525/931
[58] Field of Search .................. 525/305, 309, 931

[56]  References Cited

U.S. PATENT DOCUMENTS 3,883,617  5/1975  Krieg et al. .................. 525/309
3,914,338  10/1975  Krieg et al. .................. 525/305

FOREIGN PATENT DOCUMENTS 073450  3/1983  European Pat. Off. .
143991  6/1985  European Pat. Off. .

Primary Examiner—John C. Bleutge
Assistant Examiner—Vasu S. Jagannathan
Attorney, Agent, or Firm—Brumbaugh, Graves, Donohue & Raymond

[57]  ABSTRACT

There are disclosed a light-diffusing methacrylic resin comprising a dispersion of crosslinked fine particles in a substrate polymer comprising mainly methyl methacrylate and having the characteristics mentioned below:

(1) the difference between the refractive indexes of the crosslinked fine particles and the substrate polymer is 0.02 to 0.15.

(2) the concentration by weight of the poly-functional monomer used as starting material in the crosslinked fine particles is 5 to 20%, (3) the average particle diameter of the crosslinked fine particles in the light-diffusing methacrylic resin is 5 to 20$\mu$, the percentage of particles having a particle diameter of 2$\mu$ or less being less than 1% by weight in the total amount of the crosslinked fine particles to be mixed, and (4) the concentration by weight of the crosslinked fine particles in the light-diffusing methacrylic resin is 0.08 to 10%, and a process thereof.

14 Claims, 1 Drawing Sheet

LIGHT-DIFFUSING METHACRYLIC RESIN AND PROCESS FOR PRODUCTION THEREOF

BACKGROUND OF THE INVENTION

1. Field of the Invention

The present invention relates to a light-diffusing methacrylic resin which is suitable as materials for light diffusion, for example, illuminated covers, illuminated signs, various displays, grazings, and rear projection screens.

2. Related Art Statement

As light-diffusing materials for illuminated covers, rear projection screens, and the like, which have heretofore been widely used, there are generally used materials produced by dispersing inorganic or organic, transparent, and fine particles in transparent synthetic resins.

In this case, as the transparent synthetic resins, there are used methacrylic resins, styrene resins, or vinyl chloride resins, and light-diffusing properties are attained by incorporating the transparent synthetic resin as substrate with, for example, inorganic transparent fine particles having an average diameter of 10 $\mu$ or less of barium sulfate, calcium carbonate, quartz, etc., which have a refractive index different from that of the transparent synthetic resin, or by coating such inorganic transparent fine particles on the surface of transparent synthetic resin (see Jap. Pat. Appln. Kokai (Laid-Open) No. 54-155241, Jap. Pat. Pub. No. 46-43189, and Japanese Utility Model Registration Examined Publication No. 29-7440). There are also known light-diffusing materials obtained by including polymer fine particles obtained by copolymerizing substituted or unsubstituted styrene with a polyfunctional monomer, in place of the above-mentioned fine particles (see Jap. Pat. Pub. Nos. 39-10515, 46-11834 and 55-7471).

The resins disclosed in these prior art references are intended to improve the diffusing properties and are fairly effective. However, in recent years, sufficiently effective utilization of light has become important in the case of illuminated covers, displays, etc., because of the need of energy conservation.

When the quantity of light from a light source is constant, one of desired properties of a light-diffusing material is to diffuse light in a required direction, namely, directively, with a minimum of light absorption. On the other hand, when a directional light-diffusing material is used in instruments such as illuminated covers or displays, it is required to be formed into a shape suitable for these instruments. Examples of the suitable shape are shapes for surrounding light sources, flat plate having fine mat finished surface, and regular shapes such as lenticular lens shape and Fresnel lens shape.

Therefore, there is desired a material which not only possesses improved light-diffusing properties but also can easily given the above shapes. But, conventional materials cannot said to have directive light-diffusing properties, and even when they have directivity, they are disadvantageous in that a light source is seen through them.

SUMMARY OF THE INVENTION

The present invention is intended to provide a novel light-diffusing material from these defects of prior arts.

That is, the first aspect of the invention is directed to a light-diffusing methacrylic resin comprising a dispertion of crosslinked fine particles in a substrate polymer comprising mainly methyl methacrylate, said crosslinked fine particles being obtained by copolymerizing at least either a phenyl group containing vinyl or a phenyl group containing (meth)acrylate and optionally a copolymerizable monomer with said vinyl or (meth)acrylate with a polyfunctional monomer copolymerizable therewith, and said resin being characterized in that (1) the difference between the refractive indexes of the crosslinked fine particles and the substrate polymer is 0.02 to 0.15, (2) the concentration by weight of the polyfunctional monomer in the crosslinked fine particles is 5 to 20%, (3) the average particle diameter of the crosslinked fine particles in the light-diffusing methacrylic resin is 5 to 20 $\mu$, the percentage of particles having a particle diameter of 2 $\mu$ or less being less than 1% by weight in the total amount of crosslinked fine particles to be mixed, and (4) the concentration by weight of the crosslinked fine particles in the light-diffusing methacrylic resin is 0.08 to 10%.

The second aspect of the invention is directed to a process for producing a light-diffusing methacrylic resin comprising dispersing crosslinked fine particles in a monomer comprising mainly methyl methacrylate or a partial polymer thereof which constitutes a substrate polymer, followed by casting and polymerization, said crosslinked fine particles being obtained by copolymerizing a phenyl group containing vinyl, a phenyl group containing (meth)acrylate, or a mixture of them, with a polyfunctional monomer copolymerizable therewith, and said process being characterized in that (1) the difference between the refractive indexes of the crosslinked fine particles and the substrate polymer is 0.02 to 0.15, (2) the concentration by weight of the polyfunctional monomer in the crosslinked fine particles is 5 to 20%, (3) the average particle diameter of the crosslinked fine particles in the light-diffusing methacrylic resin is 5 to 20 $\mu$, the percentage of particles having a particle diameter of 2 $\mu$ or less being less than 1% by weight in the total amount of crosslinked fine particles to be mixed, and (4) the concentration by weight of the crosslinked fine particles in the light-diffusing methacrylic resin is 0.08 to 10%.

Figure 1:
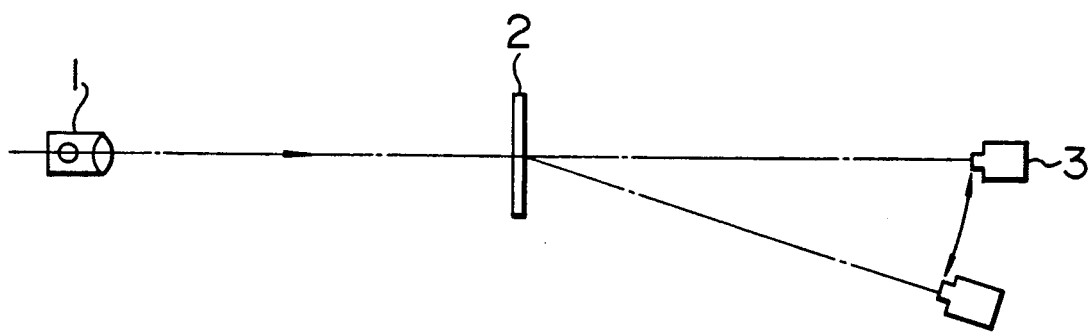
FIG. 1 is an illustration showing a measuring method of optical performance characteristics employed in examples of the present invention.

(1) . . . light source
(2) . . . sample
(3) . . . luminance meter

DETAILED DESCRIPTION OF PREFERRED EMBODIMENTS

The present invention is further explained hereunder in more detail.

The light-diffusing properties of light-diffusing materials which have been put into practical use are so good that the maximum bend angle ($\beta$ value) is 60° or more. The maximum bend angle ($\beta$ value) is defined as follows. When a light-diffusing material in which parallel ray comes perpendicular thereto is observed from the transmitted light side and the maximum luminance (peak gain) is calculated from the equation:

$$G_o = \frac{\text{Foot-lambert (ft-L)}}{\text{Foot-candle (ft-cd)}},$$

the maximum bend angle ($\beta$ value) is an angle with the optical axis which is required for the luminance (gain) to be reduced to $\frac{1}{3}$ $G_o$. The maximum bend angle ($\beta$ value) is a conventional parameter.

The present inventor investigated light-diffusing materials to which directivity could be imparted, and found the following facts. ① So long as a light source is not seen through the materials, the smaller the maximum bend angle ($\beta$ value), the easier the impartition of directivity and the larger an attainable maximum luminance (peak angle=$G_o$). ② Conventional light-diffusing materials generally have a maximum bend angle ($\beta$ value) of 20° or more, and when the concentration of light-diffusing agent is lowered (namely, the light-diffusing properties are deteriorated) to adjust the maximum bend angle ($\beta$ value) to 10° or less, a light source is seen through the light-diffusing materials, so that these materials are limited in applications.

The present invention is intended to provide a light-diffusing material having such excellent light-diffusing characteristics that even when its maximum bend angle ($\beta$ value) is 10° or less, a light source is not seen through this material, or even if seen therethrough, becomes unable to be seen therethrough when a finely not finished surface or a surface of lens shape such as Fresnel lens shape or lenticular lens shape is imparted to said material.

The light-diffusing methacrylic resin of the present invention is a copolymer of methyl methacrylate as its main constituent and monomers copolymerizable therewith. The copolymerizable monomers include methacrylic acid esters such as ethyl methacrylate, butyl methacrylate, cyclohexyl methacrylate, 2-ethylhexyl methacrylate, phenyl methacrylate, benzyl methacrylate, 2-hydroxyethyl methacrylate, glycidyl methacrylate, dimethylaminoethyl methacrylate, diethylaminoethyl methacrylate, and the like; acrylic acid esters such as methyl acrylate, ethyl acrylate, butyl acrylate, cyclohexyl acrylate, 2-ethylhexyl acrylate, phenyl acrylate, benzyl acrylate, 2-hydroxyethyl acrylate, glycidyl acrylate, dimethylaminoethyl acrylate, diethylaminoethyl acrylate, and the like; (meth)acrylic acids such as methacrylic acid, acrylic acid, and the like; polyfunctional (meth)acrylates such as diethylene glycol di(meth)acrylate, 1,3-butylene glycol di(meth)acrylate, trimethylolpropane tri(meth)acrylate, allyl (meth)acrylate, neopentyl glycol di(meth)acrylate, and the like; styrene; $\alpha$-methylstyrene; and maleic anhydride.

As the crosslinked fine particles according to the present invention, there are used those having an average particle diameter of 5 to 20 $\mu$ which are obtained by subjecting to suspension polymerization at least one phenyl group containing monomer and if necessary, a monomer copolymerizable therewith, together with a polyfunctional monomer copolymerizable with these monomers, so as to adjust the concentration of the polyfunctional monomer in the crosslinked fine particles to 5 to 20%. The phenyl group containing monomer includes phenyl group containing vinyls such as styrene, vinyltoluene, $\alpha$-methylstyrene, halogenated styrenes, and the like, and phenyl group containing (meth)acrylates such as phenyl (meth)acrylate, benzyl (meth)acrylate, and the like. The copolymerizable monomer optionally added includes methyl (meth)acrylate, ethyl (meth)acrylate, butyl (meth)acrylate, 2-ethylhexyl (meth)acrylate, 2-hydroxyethyl (meth)acrylate, (meth)acrylic acid, maleic anhydride, etc. The polyfunctional monomer includes diethylene glycol di(meth)acrylate, 1,3-butylene glycol di(meth)acrylate, trimethylolpropane tri(meth)acrylate, allyl (meth)acrylate, divinylbenzene, triallyl cyanurate, etc.

The narrower particle diameter distribution is the more preferable. At least it is necessary that the percentage of particles of 2 $\mu$ or less should be less than 1% by weight in the total amount of crosslinked fine particles to be mixed. The degree of the particle diameter distribution is preferably as follows. When the average particle diameter is taken as $X\mu$, the percentage of particles having a diameter in the range of $(1\pm0.3)\times\mu$ is 50% or more based on the total weight of particles, and both the percentages of fine particles of 2 $\mu$ or less and fine particles of 30 $\mu$ or more are preferably 0.5% or less based on the total weight of particles.

When the percentage of particles having a diameter of 2 $\mu$ or less is too high, transmitted light will be undesirably colored yellow because of selective scattering of light having a short wavelength. On the other hand, when particles having a diameter of 30 $\mu$ or more are contained, glittering due to transmitted light undesirably occurs. Therefore, the average particle diameter is preferably 6 to 12 $\mu$. When the concentration by weight of the polyfunctional monomer exceeds 20%, the light-diffusing ability will be deteriorated, namely, the maximum luminance attained without making the light-diffusing material see-through to a light source will be lowered. On the other hand, when the concentration is less than 5%, the proportion of diffused light having a large bend angle will be too low in the case of comparison at the same maximum luminance.

The concentration by weight of the crosslinked fine particles in the light-diffusing methacrylic resin should be 0.08 to 10% though it depends on the thickness in a direction of transmittance of light and desired diffusing properties and directivity for transmitted light.

EXAMPLES

The present invention is further illustrated with following examples, which should not be construed as limiting the scope of the invention.

Measuring methods

In the examples, total light transmittance was measured in accordance with ASTM D1003-61. Maximum luminance (peak gain) $G_o$ and maximum bend angle ($\beta$ value) were measured as follows. A measuring instrument and a sample are placed as shown in FIG. 1. In FIG. 1, (1) shows a collimeter mfd. by Nippon Kogaku K.K., i.e. a light source, (2) shows a sample, and (3) shows AUTO SPOT, a luminance meter mfd. by Minolta Camera Co., Ltd. Among them, the light source is set so as to cast light perpendicular to the surface of the sample (2), and its brightness is adjusted so as to adjust the illuminance on the surface of the sample (2) to 10 ft-cd. The luminance meter (3) is placed at a distance of 1 m from the sample (2) on the extension of the line connecting the light source (1) to the sample (2) and the luminance on the surface of the sample (2) was measured while the meter (3) is turned around a locus formed by the sample (2). $G_o$ is calculated from these values. In addition, the luminance meter (3) is rotated around an axis passing through the sample (2), whereby there is measured the maximum bend angle ($\beta$) at which the luminance on the surface of the sample (2) was $\frac{1}{8}$ $G_o$. Average particle diameter was measured as follows. A cumulative percentage (by weight) histogram of particle diameter is prepared by means of COULTER COUNTER Model TA-II, mfd. by Coulter Electronics INC. CO., LTD., and a particle diameter corresponding to 50% by weight is defined as average particle diameter. The degree to which a light source is seen through a sample and the appearance of a sample is judged by visual observation.

Production of crosslinked fine particles

Into a polymerizer were charged 90 parts of styrene, 10 parts of divinylbenzene, 0.1 part of 2,2'-azobis(2,4-dimethylvaleronitrile) as polymerization initiator, 100 parts of water, and 0.01 part of 70% saponificated sodium polyacrylate as dispersant, and the suspension polymerization was conducted with stirring at 80° C. After the polymerization, the particles thus obtained were washed, dried, and then classified by means of an air micron separator to obtain crosslinked fine particles having a desired particle diameter distribution.

The crosslinked fine particles shown by the code 1-1 in Table were produced in the manner described above. The 14 kinds in total of crosslinked fine particles listed in Table 1 were obtained in the same manner as described above, except for changing the composition.

TABLE 1

[Constitution of crosslinked fine particles]

| Example | Code | Monomer composition of crosslinked fine particles | | | Percentage of particles of 2 $\mu$ or less therein (wt %) | Average particle diameter ($\mu$) | Percentage of particles of 30 $\mu$ or more therein (wt %) | Difference between indexes of crosslinked fine particles and PMMA |
|---|---|---|---|---|---|---|---|---|
| | | Phenyl group containing monomer component | Comonomer | Polyfunctional monomer component | | | | |
| Example of the invention | 1-1 | St (90) | — | DVB (10) | 0.2 | 8.0 | 0 | 0.11 |
| | 1-2 | St (95) | — | DVB (5) | 0.1 | 6.7 | 0 | 0.11 |
| | 1-3 | St (95) | — | DVB (5) | 0.2 | 9.3 | 0.4 | 0.11 |
| | 1-4 | St (95) | — | DVB (5) | 0 | 11.3 | 0 | 0.11 |
| | 1-5 | St (85) | — | DVB (15) | 0.1 | 9.2 | 0 | 0.11 |
| | 1-6 | St (57) | MMA (38) | DVB (5) | 0.1 | 7.7 | 0 | 0.04 |
| | 1-7 | St (47.5) | MMA (47.5) | DVB (5) | 0.1 | 8.9 | 0.3 | 0.05 |
| | 1-8 | St (38) | MMA (57) | DVB (5) | 0.2 | 7.3 | 0 | 0.06 |
| | 1-9 | St (95) | — | EDMA (5) | 0.1 | 7.1 | 0 | 0.11 |
| | 1-10 | PMA (90) | — | AMA (10) | 0.1 | 8.3 | 0 | 0.11 |
| Comparative Example | 2-1 | St (95) | — | DVB (5) | 1.4 | 4.1 | 0 | 0.11 |
| | 2-2 | St (75) | — | DVB (25) | 0.4 | 9.2 | 0 | 0.11 |
| | 2-3 | St (95) | — | DVB (5) | 0 | 18.0 | 1.0 | 0.11 |
| | 2-4 | St (98) | — | DVB (2) | 0.2 | 10.5 | 0 | 0.11 |

Note
St: styrene,
DVB: divinylbenzene,
MMA: methyl methacrylate,
EDMA: ethylene glycol dimethacrylate,
PMA: phenyl methacrylate,
AMA: acryl methacrylate,
PMMA: poly(methyl methacrylate)

Production of a light-diffusing resin plate

Each kind of crosslinked fine particles listed in Table 1 were blended with 100 parts of a methyl methacrylate partial polymer (polymerization conversion: 20%) in the proportion shown in Table 2, and were sufficiently dispersed in the partial polymer. To the resulting mixture were added 0.01 part of dioctyl sulfosuccinate-sodium salt as mold release agent and 0.04 part of 2,2'-azobis(2,4-dimethylvaleronitrile) as polymerization initiator, and after dissolution, the mixture thus obtained was deaerated and then poured into a mold which had been previously composed of two inorganic glass plates so as to adjust the thickness of a plate to be molded to 2 mm. This mold was immersed in a hot water bath at 65° C. for 180 minutes and then placed in an air bath at 120° C. for 120 minutes to complete the polymerization. After cooling, a resin plate was taken out of the mold, and its optical performance characteristics were evaluated. The results obtained are shown in Table 2.

TABLE 2

[Optical performance characteristics of resin plates]

| Example | | Crosslinked fine particles used | | Total light transmittance (%) | $G_o$ (ft-L/ft-cd) | Maximum bend angle $\beta$ (degree) | Seeability of a light source through the resin plate | Appearance | |
|---|---|---|---|---|---|---|---|---|---|
| | | Code | Concentration (parts by weight) | | | | | Yellowing | Glittering due to transmitted light |
| Example of the invention | 1 | 1-1 | 0.30 | 87.0 | 50 | 6.8 | None | None | None |
| | 2 | 1-2 | 0.21 | 86.5 | 50 | 6.8 | None | None | None |
| | 3 | 1-3 | 0.43 | 84.5 | 50 | 7.6 | None | None | None |
| | 4 | 1-4 | 0.41 | 84.9 | 50 | 7.6 | None | None | None |
| | 5 | 1-5 | 0.40 | 88.4 | 30 | 6.2 | None | None | None |
| | 6 | 1-6 | 0.61 | 85.3 | 50 | 7.8 | None | None | None |
| | 7 | 1-7 | 0.77 | 84.7 | 50 | 7.8 | None | None | None |
| | 8 | 1-8 | 1.01 | 84.8 | 50 | 7.8 | None | None | None |
| | 9 | 1-9 | 0.30 | 85.5 | 50 | 7.8 | None | None | None |

TABLE 2-continued

[Optical performance characteristics of resin plates]

| | Crosslinked fine particles used | | | | | Appearance | | |
|---|---|---|---|---|---|---|---|---|
| Example | Code | Concentration (parts by weight) | Total light transmittance (%) | $G_o$ (ft-L/ft-cd) | Maximum bend angle $\beta$ (degree) | Seeability of a light source through the resin plate | Yellowing | Glittering due to transmitted light |
| | 10 | 1-10 | 0.70 | 84.7 | 50 | 7.7 | None | None | None |
| Comparative Example | 11 | 2-1 | 0.21 | 82.8 | 50 | 7.8 | None | Occurred | None |
| | 12 | 2-2 | 0.22 | 88.4 | 50 | 0.8 | Occurred | None | None |
| | 13 | 2-3 | 0.70 | 88.5 | 50 | 8.0 | None | None | Occurred |
| | 14 | 2-4 | 0.63 | 87.9 | 50 | 8.0 | None | None | None |

As is clear from Table 2, the resin plates were so excellent in that they had a large $G_o$, that in particular, a light source was not seen through them even when the $\beta$ value was 10° or less, and they had an appearance free from yellowing and glittering due to transmitted light.

Examples of the present invention are described above but should not be construed as limiting the scope of the invention. For example, it is, of course, possible to use the light-diffusing methacrylic resin of the present invention not only in the shape of a plate but also after being given a surface(s) of Fresnel lens shape and/or lenticular lens shape or other lens shapes, or after being formed into a spherical shape, dish shape or box shape.

Since the light-diffusing methacrylic resin of the present invention is constituted as described above in detail, it has, for example, the following partially very effective characteristics. Said resin is well balanced between brightness and the maximum bend angle; in particular, said resin has such a performance that a light source is not seen therethrough even when the maximum bend angle is 10° or less; and said resin has an excellent appearance and moreover can be molded and processed like ordinary methacrylic resins.

What is claimed is:

1. A light-diffusing methacrylic resin comprising a dispersion of crosslinked fine particles in a substrate polymer comprising mainly methyl methacrylate, said crosslinked fine particles being obtained by copolymerizing at least either a phenyl group containing vinyl or a phenyl group containing (meth)acrylate with a polyfunctional monomer copolymerizable therewith, and said resin being characterized in that
   (1) the difference between the refractive indexes of the crosslinked fine particles and the substrate polymer is 0.02 to 0.15,
   (2) the concentration by weight of the polyfunctional monomer in the crosslinked fine particles is 5 to 20%,
   (3) the average particle diameter of the crosslinked fine particles in the light-diffusing methacrylic resin is 5 to 20 $\mu$, the percentage of particles having a particle diameter of 2 $\mu$ or less being less than 1% by weight in the total amount of the crosslinked fin particles to be mixed, the percentage of particles having a particle diameter of 30 $\mu$ or more being less than 0.5% by weight of the total amount of the crosslinked fine particles to be mixed, and
   (4) the concentration by weight of the crosslinked fine particles in the light-diffusing methacrylic resin is 0.08 to 10%.

2. A light-diffusing methacrylate resin according to claim 1, whereon styrene is used as the phenyl group containing vinyl.

3. A light-diffusing methacrylic resin according to claim 1, whereon phenyl methacrylate is used as the phenyl group containing (meth)acrylate.

4. A light-diffusing methacrylic resin according to claim 1, whereon divinylbenzene is used as the polyfunctional monomer.

5. A light-diffusing methacrylic resin according to claim 1, whereon ethylene glycol dimethacrylate is used as the polyfunctional monomer.

6. A light-diffusing methacrylic resin according to claim 1, wherein acryl methacrylate is used as the polyfunctional monomer.

7. A light-diffusing methacrylic resin according to claim 1, whereon styrene is used as the phenyl group containing vinyl and divinylbenzene is used as the polyfunctional monomer.

8. A process for producing a light-diffusing methacrylic resin comprising dispersing crosslinked fine particles in a monomer comprising mainly methyl methacrylate or a partial polymer thereof which constitutes a substrate polymer, followed by casting and polymerization, said crosslinked fine particles being obtained by copolymerizing a phenyl group containing vinyl, a phenyl group containing (meth)acrylate, or a mixture of them, with a polyfunctional monomer copolymerizable therewith, and said process being characterized in that
   (1) the difference between the refractive indexes of the crosslinked fine particles and the substrate polymer is 0.2 to 0.15,
   (2) the concentration by weight of the polyfunctional monomer in the crosslinked fine particles is 5 to 20%,
   (3) the average particle diameter of the crosslinked fine particles in the light-diffusing methacrylic resin is 5 to 20 $\mu$, the percentage of particles having a particle diameter of 2 $\mu$ or less being less than 1% by weight in the total amount of the crosslinked fine particles to be mixed, the percentage of particles having a particle diameter of 30 $\mu$ or more being less than 0.5% by weight of the total amount of the crosslinked fine particles to be mixed, and
   (4) the concentration by weight of the crosslinked fine particles in the light-diffusing methacrylic resin is 0.08 to 10%.

9. A process according to claim 8, wherein styrene is used as the phenyl group containing vinyl.

10. A process according to claim 8, wherein phenyl methacrylate is used as the phenyl group containing (meth)acrylate.

11. A process according to claim 8, wherein divinylbenzene is used as the polyfunctional monomer.

12. A process according to claim 8, wherein ethylene glycol dimethacrylate is used as the polyfunctional monomer.

13. A process according to claim 8, wherein acryl methacrylate is used as the polyfunctional monomer.

14. A process according to claim 8, wherein styrene is used as the phenyl group containing vinyl and divinylbenzene is used as the polyfunctional monomer.

* * * * *